Oct. 1, 1963  W. RODWELL  3,105,805
NUCLEAR REACTOR MODERATOR STRUCTURES
Filed July 1, 1958  10 Sheets-Sheet 1

INVENTOR
WILLIAM RODWELL
BY *Larson and Taylor*
ATTORNEYS 3,105,805
NUCLEAR REACTOR MODERATOR
STRUCTURES
William Rodwell, Culcheth, near Warrington, England, assignor to United Kingdom Atomic Energy Authority, London, England
Filed July 1, 1958, Ser. No. 745,955
Claims priority, application Great Britain July 1, 1957
3 Claims. (Cl. 204—193.2)

This invention relates to moderator and reflector structures for nuclear reactors.

A conventional moderator and reflector structure for a nuclear reactor comprises stacks of uniform right prismatic blocks positioned in layers extending one beyond the other in the direction of the lengths of the blocks, the blocks in the moderator being suitably spaced to allow for growth under the effects of irradiation. Such a structure is not in itself stable and the problem of instability is aggravated by internal pressure of coolant passing through the structure. Where the structure is required for part of a reactor built into a moving body such as a ship further difficulties arise due to the forces consequent upon accelerations in diverse directions. Accordingly a restraint has to be provided to meet the difficulties referred to above whilst allowing for dimensional changes in the lifetime of the reactor. The design of restrain has to be based on the assumption that maintenance is not practicable.

Th present invention provides a simple and reliable restraint for a moderator reflector structure suitable in particular for use in a reactor built into a moving body.

A restraint band according to the invention for use in applying a restraint force to a nuclear reactor moderator reflector structure housed in a containment vessel comprises a series of shoes through which said restraint force is applied, the shoes being pivoted on members themselves pivoted on a common pitch circle from the wall of the containment vessel so that movement of said members urges the shoes against the moderator reflector structure, rigid links between and pin jointed to said members arranged so that in any adjacent pair of members the pivots of the members and the pin joints of the links form the corners of a parallelogram and spring means for urging at least one of said shoes against the moderator-reflector structure.

One embodiment of the invention will now be described by way of example with reference to the accompanying drawings in which.

Figure 1:
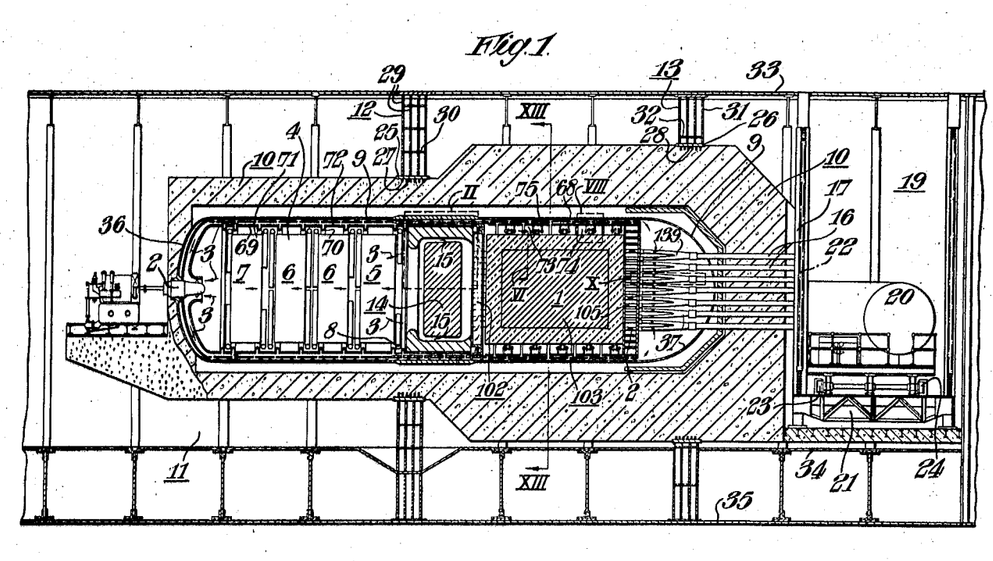
FIG. 1 is a longitudinal sectional elevation of a nuclear reactor installed in and providing the motive power of a ship.

In general FIG. 1 shows a nuclear reactor installed in and providing the motive power for a ship.

Power is derived from a gas cooled graphite moderated reactor 1 giving heat to pressurised carbon dioxide gas which is passed in a closed circuit by turbo-driven circulators 2 along paths indicated by arrows 3. The heat is taken from the carbon dioxide gas by a heat exchanger 4 having a super heater zone 5, two evaporator zones 6 and an economiser zone 7. The heat appears as super heated steam taken from the zone 5 and passed through pipes 8 to supply propulsion machineary which can be either a directly acting geared turbine or of turbo-electric form. The reactor 1 and the heat exchanger 4 are contained within a horizontally oriented cylindrical pressure vessel 9 and a concrete biological radiation shield 10. The radiation shield is supported within a compartment 11 of the ship by transverse bulkheads 12 and 13. An intermediate shield 14 is provided between the reactor 1 and the heat exchanger 4. The shield 14 has channels 15 for gas flow from the reactor 1 to the heat exchanger 4. Fuel element refueling tubes 16 are provided passing from a charge face 17 external to the biological shield 10 through the shield 10 and the pressure vessel 9 to fuel element channels in the reactor 1. The tubes 16 terminate at the charge face 17 in a refueling room 19 containing a refueling machine 20 which can move vertically on a frame 21 by rotation of screws 22 and in a transverse direction across the charge face 17 on wheels 23 running on rails 24.

(1) *The support of the biological radiation shield 10.*—As stated above the biological radiation shield 10 is supported within a compartment 11 of the ship by transverse bulkheads 12 and 13. The shield 10 is surrounded by bearing rings 25 and 26 having spines 27 and 28 respectively embedded in the shield 10. The bearing ring 25 is welded to the bulkhead 12 which comprises four parallel members 29 stiffened by circumferential webs 30. The bearing ring 26 is welded to the bulkhead 13 which comprises four parallel members 31 stiffened by welded webs 32. The bulkheads 12 and 13 are welded between beams 33 forming part of the deck structure of the ship and beams 34 and 35 forming part of the double bottom of the ship. The bulkhead 13 forms a fixed support for the radiation shield 10 while the bulkhead 12 is axially deflectable as a diaphragm whilst being transversely rigid.

Figure 3:
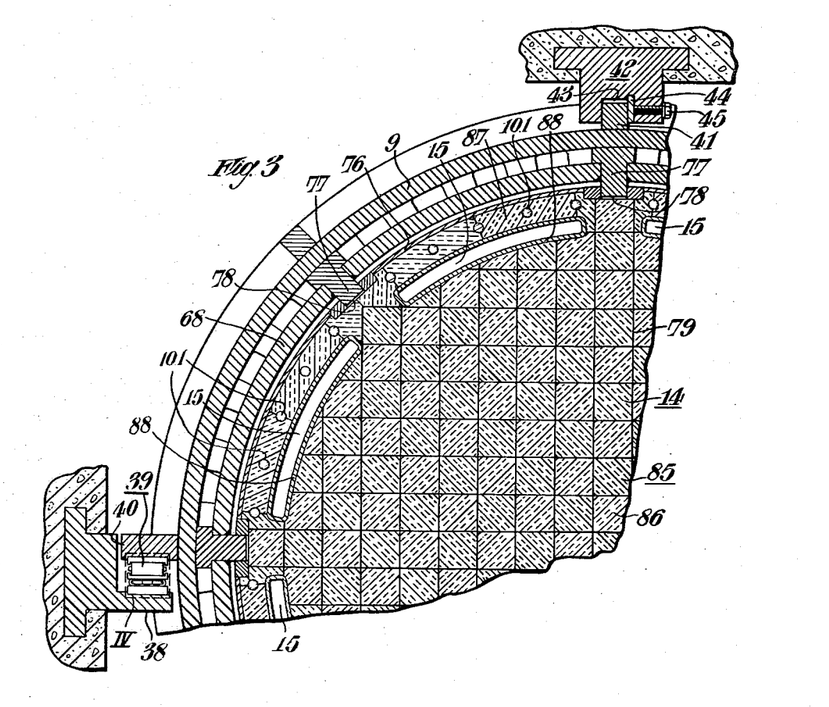
FIG. 3 is a quarter section along the line III—III in FIG. 2.

(2) *The support of the pressure vessel 9 within the radiation shield 10.*—The pressure vessel 9 has domed ends 36 and 37 and as shown in FIG. 3 is supported inside the radiation shield 10 by brackets 38 extending longitudinally through the shield 10. The brackets 38 support the pressure vessel 9 through roller bearings 39 and flanges 40 welded to the vessel 9. Longitudinal keys 41 welded to the top and bottom of the pressure vessel 9 co-operate with slotted members 42 inside the shield 10. The keys 41 engage with slots 43 in the members 42 and the slots 43 are fitted with packing shims 44 retained by bolts 45.

Figure 4:
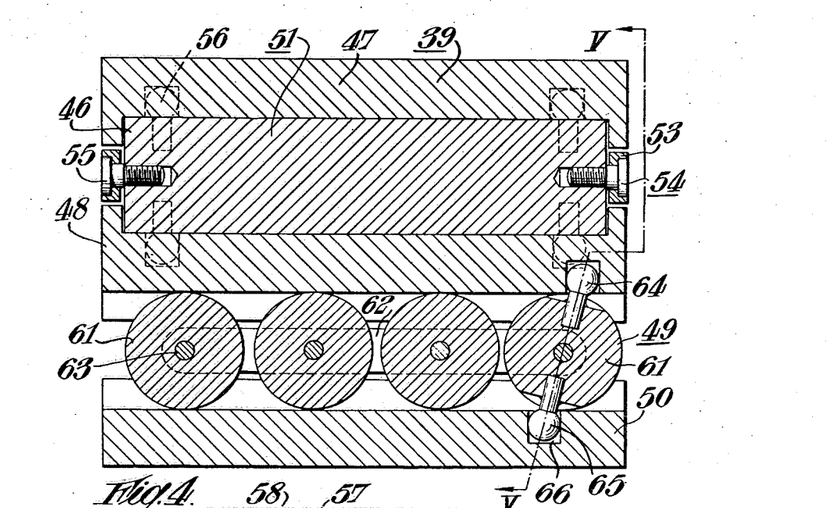
FIG. 4 is that detail of FIG. 3 embraced by the box IV and drawn on a larger scale.
Figure 5:
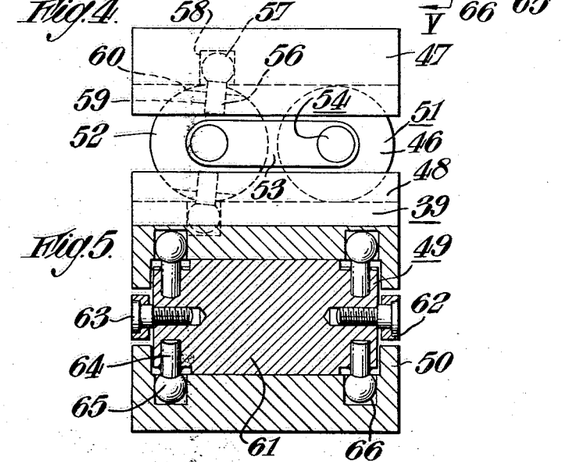
FIG. 5 is a section along the line V—V in FIG. 4.

As shown in FIGS. 4 and 5 each roller bearing 39 comprises a roller assembly 46 acting between upper and central bearing plates 47 and 48 and a roller assembly 49 acting between the central bearing plate 48 and a lower bearing plate 50.

The roller assembly 46 comprises a pair of cylindrical rollers 51 and 52 joined in parallel by links 53. Bearing pins 54 screwed into the rollers 51 and 52 have stepped heads 55. The links 53 are drilled to accommodate the heads 55 of the bearing pins 54. The bearing plates 47 and 48 are of channel section providing lateral location of the roller assembly 46. The roller 52 is fitted with diametrically opposed locating pins 56 having ball heads 57 which engage with sockets 58 drilled in the bearing plates 47 and 48. The locating pins 56 are welded in holes 59 drilled in flats 60 machined on the roller 52.

The roller assembly 49 comprises four cylindrical rollers 61 joined in parallel by links 62 and bearing pins 63 (respectively similar to the links 53 and the bearing pins 54). The end roller 61 is fitted with locating pins 64 (similar to the pins 56). The pins 64 have ball heads 65 which engage with sockets 66 in the bearing plates 48 and 50. The bearing plates 48 and 50 are channeled to provide for lateral location of the roller assembly 49 which operates in a direction at right angles to the direction of operation of the roller assembly 46.

The pressure vessel 9 is fixed to the biological shield 10 in the region of the intermediate shield 14 and longitudinal thermal expansion of the pressure vessel 9 is accommodated by movement of the roller bearings 39 and by sliding of the keys 41 in the slotted members 42. Radial thermal expansion of the pressure vessel 9 is also accommodated by the roller bearings 39 and by clearances 67 between the keys 41 and the slotted members 42. Bodily movements of the pressure vessel 9 due to inertia forces can cause the bearing plates 47, 48 and 50 of the roller bearings 39 to temporarily move apart. Should this happen the roller assemblies 46 and 49 are held captive and correctly positioned by the locating pins 56 and 64.

(3) *The construction and support of the intermediate shield 14.*—As shown in FIG. 1 the pressure vessel 9 is strengthened by internal ring and web units 68. The vessel 9 and the ring and web units 68 are thickened in the vicinity of the shield 14 to accept the large weight of this component. The heat exchanger 4 is contained within a barrier sleeve 69 having bellows expansion joints 70 and dividing the pressure vessel 9 into an inner cylindrical zone 71 and an outer annular zone 72. In the region of the reactor 1 the pressure vessel 9 is divided by a perforated cylindrical casing 73 into an inner cylindrical zone 74 and an outer annular zone 75 respectively corresponding to the zones 71 and 72 in the region of the heat exchanger 4.

Figure 2:
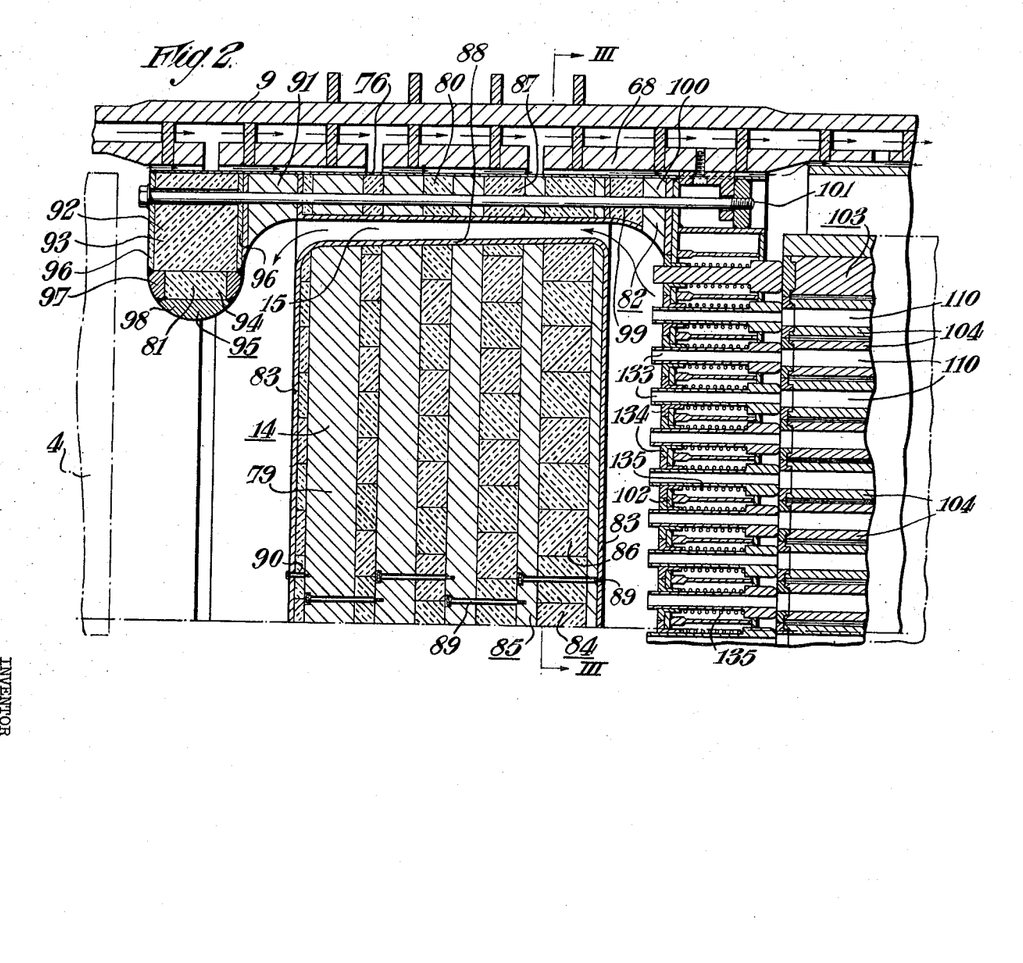
FIG. 2 is that detail of FIG. 1 embraced by the box II and drawn on a larger scale.

As shown in FIGS. 2 and 3 the shield 14 is contained within a cylindrical casing 76 concentrically located within the pressure vessel 9. Radial keys 77 located between the inner wall of the pressure vessel 9 and the ring units 68 engage in longitudinal keyways 78 in the casing 76 and thus support the shield 14. In addition to supporting the shield 14 the keys 77 extend throughout the length of the pressure vessel 9 and support the barrier sleeve 69 and the perforated casing 73 in a similar manner.

The intermediate shield 14 comprises a circular centre section 79 surrounded by an outer ring 80 of shielding. The channels 15 through the shield 14 are defined between the centre section 79 and the outer ring 80. The channels 15 are overhung on the heat exchanger side of the shield 14 by a further ring of shielding 81 while the ring 80 of shielding has an extension 82 on the reactor side to provide a smooth entry of gas into the channels 15 and prevent radiation scatter through the channels 15.

The casing 76 containing the shield 14 is fitted with mild steel face plates 83 and between the face plates 83 there are alternating layers of graphite and boron steel 84 and 85, the layers of graphite 84 decreasing in thickness and the layers of steel 85 increasing in thickness passing from the reactor side to the heat exchanger side of the shield 14.

In the centre section 79 of the shield 14 the layers of graphite 84 are composed of square section graphite blocks 86 while in the outer ring of shielding 80 the layers of graphite 84 are composed of graphite blocks 87 of part annular cross-section. (See FIG. 3 which shows the layer of graphite 84 at the section along the line III—III in FIG. 2.) The layers of steel 85 which are of integral welded form extend across the whole section of the casing 76 and are pierced to preserve the continuity of the channels 15 defined in the layers of graphite 84 between the graphite blocks 86 and 87. The channels 15 of which there are eight have mild steel liners 88 extending between the face plates 83 and end welded thereto. Each graphite layer 84 is clamped between two adjacent steel layers 85 by bolts 89 excepting the last layer of graphite 84 on the heat exchanger side which is clamped between the adjacent layer of steel 85 and the adjacent face plate 83 by bolts 90.

The ring of shielding 81 comprises a shaped steel ring 91 and a composite ring of graphite 92 composed of an outer ring of part annular graphite blocks 93 and an inner ring of smaller graphite blocks 94 also of part annular form. The ring of graphite 92 is contained by a composite steel casing 95 comprising two mild steel face plates 96 shaped mild steel rings 97 edge welded to the face plates 96 and a mild steel liner ring 98 seam welded to the rings 97.

The extension 82 of the ring of shielding 80 comprises a steel lined ring of graphite blocks 99 and an integral welded steel ring 100. The extension 82 and the ring of shielding 81 are held in position within the casing 76 by tie bolts 101 passing longitudinally through the shield 14. The tie bolts 101 also serve to locate a circular grid 102 providing end location for a graphite moderator structure 103 forming part of the reactor 1.

The shield 14 prevents activation of the heat exchanger 4 by neutrons from the reactor 2 and acts as a gamma and neutron shield in the operation of the reactor whilst allowing passage of gas between the reactor 1 and the heat exchanger 4 without any substantial pressure drop. The shield 14 also acts as a gamma shield with the reactor shut down so that personnel can obtain access to the heat exchangers 4.

Graphite is used in the shield 14 in preference to concrete because of its better resistance to heat. The layers of steel 85 in the shield 14 absorb gamma radiation while the graphite absorbs neutrons. The thicker layers of steel towards the heat exchanger side of the shield 14 absorb gamma radiation produced by fast neutrons in the thinner layers 85.

The layers of graphite 84 are made thinner towards the heat exchanger side of the shield 14 as the majority of neutrons are absorbed by the thicker layers 84.

Figure 6:
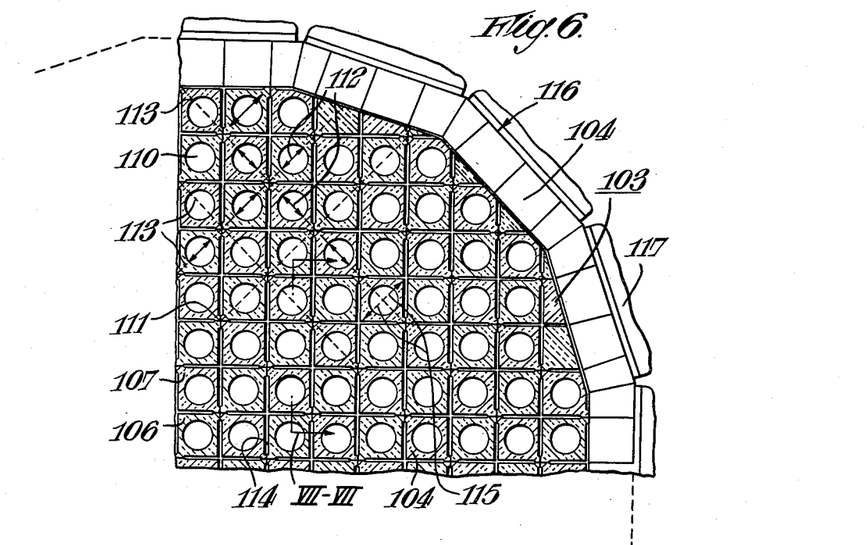
FIG. 6 is a quarter section along the line VI—VI in FIG. 1 and shows a graphite moderator structure embodied in the reactor of FIG. 1.
Figure 7:
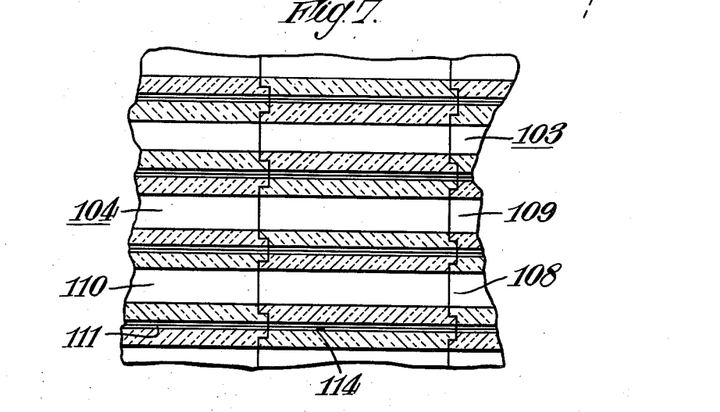
FIG. 7 is a section along the line VII—VII in FIG. 6.

(4) *The form of the moderator structure 103.*—As shown in FIGS. 6 and 7 the moderator structure 103 comprises an assembly of square cross section graphite blocks 104 located between end support grids 102 and 105 (see FIGS. 1, 2 and 10) within the perforated casing 73. The blocks 104 are arranged in horizontal layers 106, 107 etc. to form stringers 108, 109 in which the blocks are spigotted end to end. The blocks 104 are formed to provide fuel element channels 110 passing end to end through the stringers between the end support grids 102 and 105. The blocks 104 (and hence the stringers 108 and 109) abut one another on their side faces 111 and have minimum Wigner growth properties as indicated by the arrows 112. It is to be noted that the direction of the arrows 112 changes between adjacent blocks 104 so as to be first in one direction and then in a direction perpendicular thereto, whilst along any diagonal (such as indicated by the dotted lines 113) the direction is always the same. The blocks 104 have recesses 114 which allow space for Wigner growth along directions perpendicular to the arrows 112 as indicated by the chain-dotted arrows 115. The outer blocks 104 of the structure 103 have no fuel element channels 110 and are shaped so that the structure 103 has sixteen longitudinal faces 116.

Figure 8:
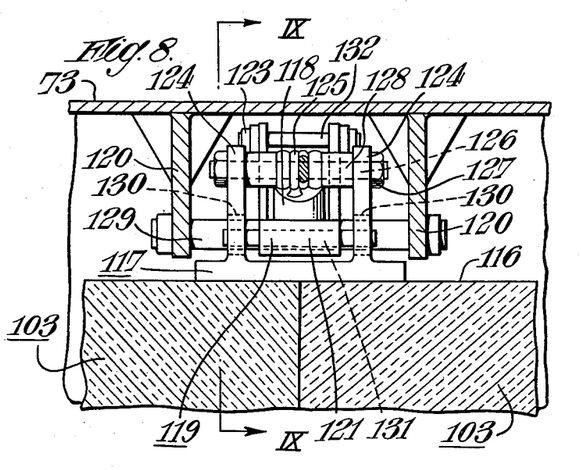
FIG. 8 is a sectional detail in the plane of FIG. 1 at the box VIII showing a form of restraint for the moderator structure of FIG. 6.
Figure 9:
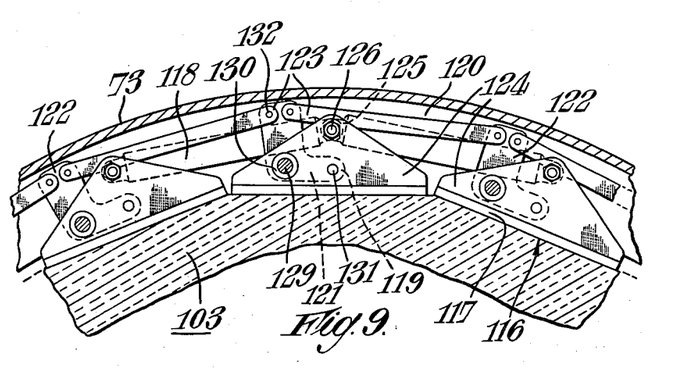
FIG. 9 is a section along the line IX—IX in FIG. 8.

(5) *The restraint of the moderator structure 103.*—In FIGS. 8 and 9 sixteen restraint shoes 117 located against the horizontal faces 116 of the structure 103 are coupled together by tension springs 118 forming a garter round the moderator structure 103. Sixteen bell cranks 119 are pivoted between internal flanges 120 welded inside the perforated casing 73. The shoes 117 are pivoted on arms 121 of the bell cranks 119 while double arms 122 of the bell cranks 119 are connected by rigid pivoted links 123.

The shoes 117 are formed with a pair of integral lugs 124. The tension springs 118, which are of the form disclosed in a co-pending application Serial No. 552,662, filed December 12, 1955, now Patent No. 2,865,828, in the names of Everett Long and Frank Geoffrey Greenhalgh, have coupling eyes 125 at which connection is made with each shoe 117 by means of a pin 126 fixed spanning the lugs 124 by nuts 127. Spacer sleeves 128 afford longitudinal location of the coupling eyes 125 on the pins 126. The bell cranks 119 rotate on pivot pins 129 extending between the internal flanges 120 carried by the casing 73. The pivot pins 129 also pass through holes 130 in the lugs 124 of the shoes 117 and the holes 130 are made of sufficient diameter so as not to restrict the movement of the shoes 117. The shoes 117 are pivotted on the single arms 121 of the shoes 117 by pins 131 extending between the lugs 124 and the links 123 are coupled with the double arms 122 of the bell cranks 119 by pivot pins 132.

The geometry of the arrangement is such that any movement of one of the shoes 117, due to such unidirectional inertia forces as may arise from bodily movements of the moderator-reflector 103, rotates the associated bell crank 119. The motion of this bell crank 119 is transmitted equally to the other bell cranks 119 producing an equal movement in all of the shoes 117 against the loading of the tension springs 118. However if the loading of the tension springs 118 is made sufficiently high, such movements may be suppressed whilst the arrangement allows for normal dimensional changes of the moderator structure 103 during the working life of the reactor 1.

As shown in FIG. 1 five garters of similar form are used along the length of the moderator structure 103.

Referring to FIG. 2 the structure 103 is compressed axially by members 133 slidable in bearing bushes 134 fitted to the end support grid 102. The members 133 are loaded by springs 135 and are tubular thus providing a continuance of the fuel element channels 110 through the end support grid 102. The structure 103 is also compressed axially by the refuelling tubes 16 in a manner described below.

Figure 10:
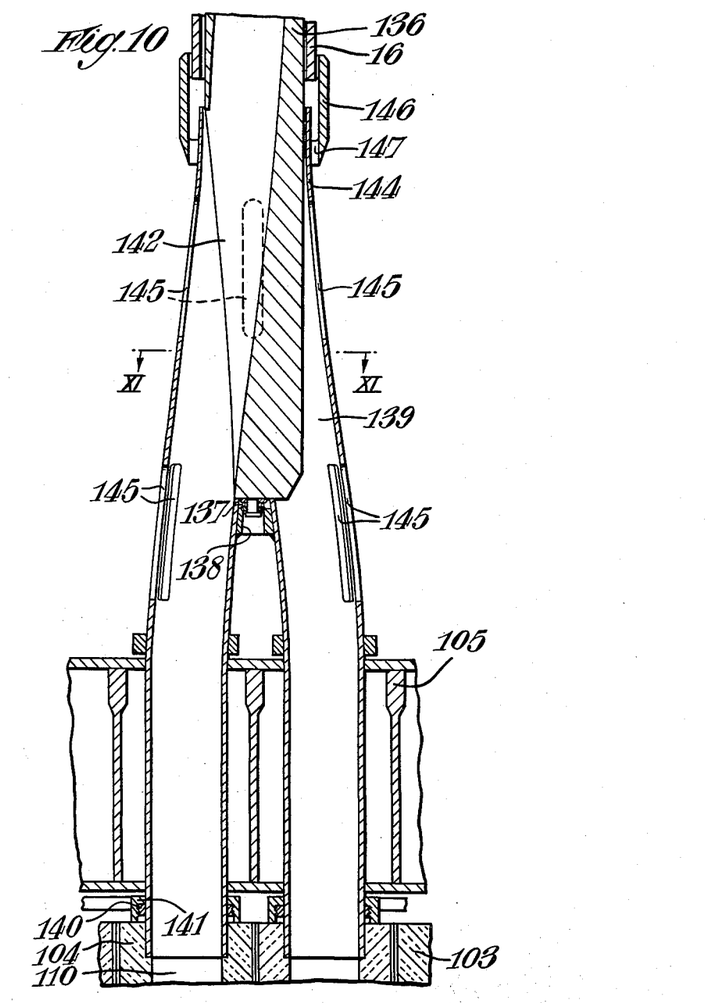
FIG. 10 is a detail of FIG. 1 in the area embraced by the box X and shows a fuel element refuelling tube. The figure is in sectional form and is drawn turned through 90° with respect to the alignment in FIG. 1 for the convenience of drawing.
Figure 11:
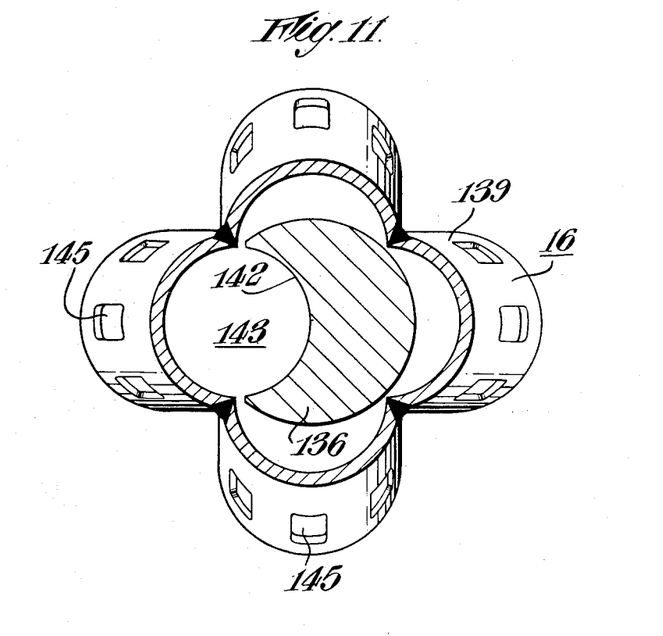
FIG. 11 is a section along the line XI—XI in FIG. 10.
Figure 12:
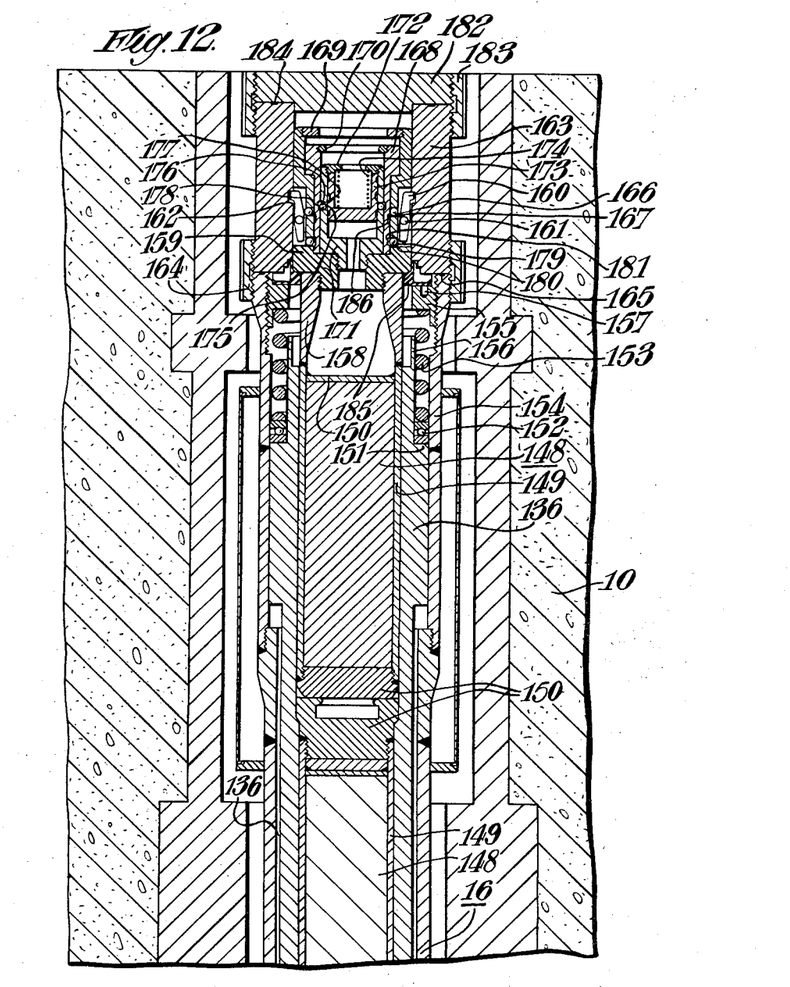
FIG. 12 shows in cross section a structure associated with the fuel element re-fueling tube of FIG. 10.

(6) *The fuel element refuelling tubes 16.*—As shown in FIGS. 10, 11 and 12 each fuel element refueling tube 16 contains a hollow thrust rod 136 rotatably mounted on a thrust bearing 137 which seats on a block 138 welded to a group of four pipes 139 coupling with four of the fuel element channels 110 in the moderator structure 103. The pipes 139 pass through the end support grid 105 and have flanges 140 screw threaded to accept clamping rings 141 which bear against the moderator structure 103.

The bore of the thrust rod 136 breaks through the wall of the rod 136 at a cut-away part 142 so that a passageway is provided between the rod 136 and the pipes 139 to provide a chute 143 for fuel elements entering and leaving the fuel element channels 110. The pipes 139 meet in a single pipe 144 and coolant ports 145 are provided in both the pipes 139 and pipe 144. The pipe 144 ends in a guide bracket 146 to which it is connected by webs 147. The bracket 146 acts as a guide for the refuelling tube 16 surrounding the rod 136.

Referring to FIGS. 1 and 12 the rods 136 and refuelling tube 16 pass through the reactor pressure vessel 9 and then through the radiation shield 10. Each tube 16 is welded to the pressure vessel 9 and the rods 136 contain concrete shield plugs 148 in steel sheaths 149 with end caps 150, two separate plugs being provided to save headroom when removed in readiness for charging and discharging fuel elements. Near its upper end 151 each thrust rod 136 is stepped to carry a thrust bearing 152. A spring 153 in a spring housing 154 which forms a continuation of the refuelling tube 16, acts against the bearing 152 and an adjustable collar 155 screwed into the housing 154. The upper end 151 of the rod 136 has internal splines 156. A hole 157 is provided for a suitable key for turning the collar 155. The sheath 149 of the upper shield plug 148 extends into a shaped sleeve 158 which has a cup-shaped member 159 screwed into it. The plugs 148 and member 159 are restrained from being ejected from the rod 136 by gas pressure in the reactor 1 by latches 160 pivoted on pins 161 the latches 160 engaging with recesses 162 in a sleeve 163 coupled with the spring housing 154 by a screwed collar 164 and sealed by rings 165. The latches 160 are retained in position by balls 166 carried in slots 167 in the member 159 the balls 166 themselves being forced outwards against the latches 160 by a sleeve 168. The sleeve 168 is secured in the member 159 by a ring 169 and carries a lifting ring 170. Within the sleeve 168 there is a second cup-shaped member 171 screwed into the member 159. The top end of member 171 is screwed to receive a retaining ring 172 and has inside a piston 173 loaded from the ring 172 by a spring 174. In the wall of member 171 there are slots 175 containing balls 176 which are greater in diameter than the thickness of the wall. The extra space for the balls 176 is provided alternatively by circumferential grooves 177 in the piston 173 and grooves 178 in sleeve 168. Balls 179 are carried in slots 180 and they rest in a groove 181 in the sleeve 168. The balls 179 are provided to operate the latches 160 to release them from the sleeve 163 when the sleeve 168 is lifted. The sleeve 163 is closed by a cover 182 and screwed collar 183 and sealed by a ring 184. A rubber seal 185 is provided between the sleeve 163 and cup-shaped member 159.

To charge and discharge fuel elements through the refuelling tube 16 the cover plate 182 is removed and the pressure of the gas in the tube 16 is taken at the seal 185. A connection is made to the refuelling machine 20 by an adaptor sealing with the sleeve 163. The refuelling machine 20 is then pressurised so that the piston 173 is forced down the member 171. The balls 176 fall into the slot 173 and the sleeve 168 is then free to be lifted by engagement at the lifting ring 170. As the sleeve 168 is raised the balls 166 fall into grooves 186 in the sleeve 168 and the balls 179 press on the bottom of the latches 160 thus releasing the latches from the recesses 162. The cup-shaped member 171 and shield plugs 148 may now be withdrawn and refuelling commenced. When one channel 110 has been refuelled the rod 136 is rotated by engagement of a tool in the charge machine and the splines 156 so that the second channel can be refuelled and so on until all four channels have been refuelled. A thrust is continuously exerted on the graphite moderator structure 103 through the spring 153, thrust rod 136, bearing 137, block 138, pipes 139 and flanges 140. The thrust of individual pipes may be adjusted through the clamping rings 141 and the total thrust through the collar 155.

Figure 13:
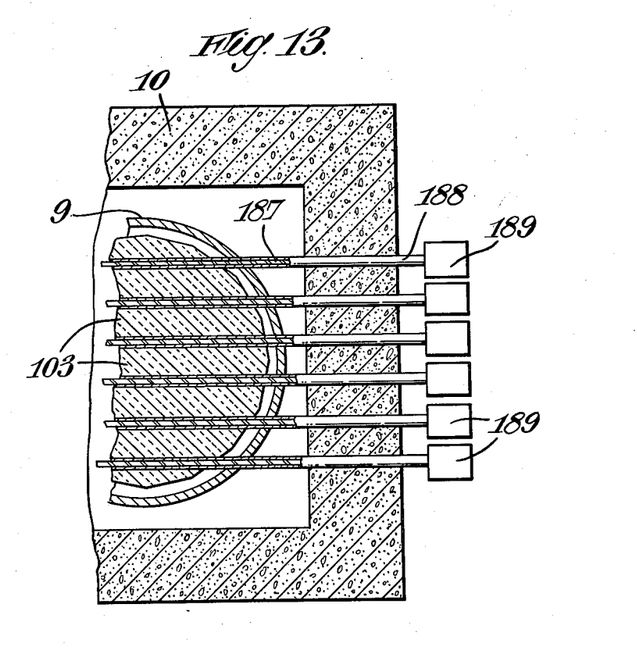
FIG. 13 is a diagrammatic cross section along the line XIII—XIII in FIG. 1.
Figure 14:
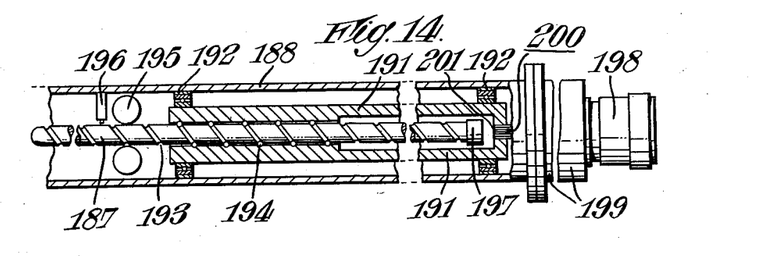
FIG. 14 shows in cross section a control rod forming part of the reactor shown in FIG. 1.

*Equipment for the control of the reactor 1.*—To control the reactivity of the core 103 of the reactor 42 transversely operating control rods 187 made of boron steel are provided. As shown in FIG. 13 the control rods 187 are inserted into and removed from the reactor core 103 along tubes 188 penetrating the biological shield 10 and the pressure vessel 9. An individual control rod operating mechanism 189 is provided for each control rod 187 external to the biological shield 10. The control rods 187 are moved by nut and screw mechanisms 190 as shown in FIG. 14. Each mechanism 190 comprises a tubular nut 191 mounted by ball races 192 inside the corresponding tube 188. The control rod 187 has a screw thread 193 and the nut 191 is coupled with the screw thread 193 by balls 194. Guide rollers 195 are provided for the control rod 187 and a mechanical latch 196 automatically engaging to hold the control rod 187 when fully inserted in the core 103. A buffer 197 is provided at the outer end of the control rod 187. The nut 191 is rotated to drive the control rod 187 by a motor 198 acting through a gear box 199 having an output shaft 200 coupled at a splined end 201 with the nut 191. The gear box 199 has a low speed forward characteristic whereby the nut 191 is rotated clockwise to withdraw the control rod 187 slowly from the core of the reactor. The gear box 199 also operates in reverse at high speed to turn the nut 191 anti-clockwise and insert the control rod 187 rapidly into the core 103 under emergency shut down conditions. A gear box suitable for the above application is described in British Patent No. 777,420.

I claim:

1. A restraint band for resiliently restraining a nuclear reactor moderator structure inside a containment vessel comprising a plurality of shoes disposed on a circle concentric with the moderator structure and having supporting faces disposed to contact the periphery of said structure, a bell crank pivotally connected with each of said shoes at one pivot point of the bell crank and pivotally connected at a second pivot point of the bell crank to lugs attached to the containment vessel wall, rigid links pin-jointed at each end to the bell cranks of adjacent shoes, the corresponding pivot points of adjacent shoes and the pin-joints of the connecting link between said adjacent shoes forming a parallelogram, and resilient means urging each of said faces against the moderator structure.

2. A restraint band as claimed in claim 1 wherein each shoe is coupled with adjacent shoes by springs in tension.

3. A restraint band as claimed in claim 2 wherein the springs comprise a nest of co-axial tubes, the tubes in each nest being end loaded one against the other so that alternate tubes are under equal tensile and compressive loads respectively, couplings to adjacent restraint shoes being provided from the innermost and outermost tubes of each nest respectively.

References Cited in the file of this patent

UNITED STATES PATENTS

| 2,464,960 | Arnold | Mar. 22, 1949 |
| 2,838,451 | Long et al. | June 10, 1958 |
| 2,852,457 | Long et al. | Sept. 16, 1958 |
| 2,863,815 | Moore et al. | Dec. 9, 1958 |
| 2,865,828 | Long et al. | Dec. 23, 1958 |
| 2,928,503 | Bless | Mar. 15, 1960 |

FOREIGN PATENTS

| 782,922 | Great Britain | Sept. 18, 1957 |

OTHER REFERENCES

Hinton et al.: "Nuclear Power," January 1958, pp. 44, 204–193.2RM. This reference is based upon British Patent 782,922, September 18, 1957 and British Patent 785,928, published November 6, 1957.